United States Patent
Tute et al.

(10) Patent No.: US 9,868,533 B2
(45) Date of Patent: Jan. 16, 2018

(54) ARMREST DEVICE

(71) Applicant: RECARO Aircraft Seating GmbH & Co. KG, Schwaebisch Hall (DE)

(72) Inventors: Christopher Tute, Schoenborn (DE); Marc Schmidt, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 203 days.

(21) Appl. No.: 14/781,409

(22) PCT Filed: Mar. 27, 2014

(86) PCT No.: PCT/EP2014/056142
§ 371 (c)(1),
(2) Date: Sep. 30, 2015

(87) PCT Pub. No.: WO2014/161765
PCT Pub. Date: Oct. 9, 2014

(65) Prior Publication Data
US 2016/0023768 A1     Jan. 28, 2016

(30) Foreign Application Priority Data

Apr. 4, 2013 (DE) .................... 10 2013 103 382

(51) Int. Cl.
*A47C 7/54* (2006.01)
*B64D 11/06* (2006.01)
(Continued)

(52) U.S. Cl.
CPC ............ *B64D 11/0647* (2014.12); *B60N 2/46* (2013.01); *B60N 2/70* (2013.01); *B64D 11/06* (2013.01); *B64D 11/0646* (2014.12)

(58) Field of Classification Search
CPC ...... B60N 2/46; B64D 11/0647; B64D 11/06; B64D 11/110646; B64D 11/0646
(Continued)

(56) References Cited

U.S. PATENT DOCUMENTS 5,769,496 A * 6/1998 Gryp ................. A47C 1/03
                                                                         297/411.32
5,951,094 A     9/1999   Konishi et al.
(Continued)

FOREIGN PATENT DOCUMENTS

DE    10 2004 027 867 A1    1/2006
DE    10 2008 034 529 A1    6/2010
(Continued)

OTHER PUBLICATIONS

German Search Report dated Jan. 31, 2014 in the corresponding German application No. DE 10 2013 103 382.2 (Partial translation attached).
(Continued)

*Primary Examiner* — Chi Q Nguyen
(74) *Attorney, Agent, or Firm* — Posz Law Group, PLC

(57) ABSTRACT

An armrest device for an aircraft seat has a cushion unit, which is at least substantially implemented by an elastomer and which is provided at least for forming an elastic substrate for an arm support for a passenger. The cushion unit has a comfort structure, which is provided for adjustment of an elastic deformability of the cushion unit.

15 Claims, 3 Drawing Sheets

(51) Int. Cl.
*B60N 2/46* (2006.01)
*B60N 2/70* (2006.01)

(58) Field of Classification Search
USPC .......................................... 297/411.46, 411.2
See application file for complete search history.

(56) References Cited

U.S. PATENT DOCUMENTS

| | | | |
|---|---|---|---|
| 6,033,013 A * | 3/2000 | Lee ........................ | A47C 7/54 297/115 |
| 6,082,683 A * | 7/2000 | Yates ................. | A47B 21/0371 156/145 |
| 6,142,563 A | 11/2000 | Townsend et al. | |
| 6,343,839 B1 | 2/2002 | Simons, Jr. et al. | |
| 7,234,779 B2 * | 6/2007 | Bedford ................... | A47C 1/03 297/344.16 |
| 7,357,443 B2 * | 4/2008 | Wolff ................. | B29C 45/1676 296/187.01 |
| 7,775,584 B2 | 8/2010 | Hughes, Jr. et al. | |
| 8,132,861 B2 * | 3/2012 | Cone ................... | B60N 2/4633 297/411.32 |
| 9,623,972 B2 * | 4/2017 | Maslakow ......... | B64D 11/0644 |
| 2008/0191537 A1 * | 8/2008 | Oda ........................ | A47C 1/03 297/411.36 |
| 2009/0256384 A1 | 10/2009 | Hughes, Jr. et al. | |
| 2010/0117415 A1 | 5/2010 | Goetsch | |
| 2012/0068518 A1 | 3/2012 | Wieland et al. | |

FOREIGN PATENT DOCUMENTS

| | | |
|---|---|---|
| DE | 10 2009 014 750 A1 | 9/2010 |
| WO | 2010108690 A1 | 9/2010 |
| WO | 2011143680 A1 | 11/2011 |

OTHER PUBLICATIONS

International Search Report & Written Opinion dated Jul. 14, 2014 in the corresponding PCT application No. PCT/EP2014/056142.
International Preliminary Report on Patentability dated Oct. 6, 2015 in the corresponding PCT application No. PCT.EP2014/056142.
Office Action dated Jun. 14, 2016 in the corresponding CN patent application No. 201480032300.6 (with English translation).
Office Action dated Feb. 16, 2017 issued in corresponding EP patent application No. 14 715 237.5 (and partial English translation).
Office Action dated Mar. 2, 2017 issued in corresponding CN patent application No. 201480032300.6 (and English summary from Chinese colleagues).

* cited by examiner

ARMREST DEVICE

CROSS REFERENCE TO RELATED APPLICATIONS

This application is a U.S. national stage application of PCT/EP2014/056142 filed on Oct. 9, 2014, which claims priority to German Patent Application No. 10 2013 103 382.2 filed on Apr. 4, 2013, the contents of which are incorporated herein by reference.

STATE OF THE ART

The objective of the invention is, in particular, to provide a generic device with improved characteristics regarding comfort, haptic and variability, in particular as regards a color.

ADVANTAGES OF THE INVENTION

The invention proceeds from an armrest device for an aircraft seat, with a cushion unit that is at least substantially implemented by an elastomer and which is provided at least for forming an elastic substrate for an arm support for a passenger.

It is proposed that the cushion unit comprises a comfort structure, which is provided for adjustment of an elastic deformability of the cushion unit. A "cushion unit" is herein to be understood, in particular, as a unit of an armrest which forms due to its characteristics a soft, elastically deformable substrate of the armrest, on which a person may rest his arm, the cushion unit being herein implemented preferably in one piece and of one single material, e.g. in particular of an elastomer. Herein the cushion unit has a thickness of maximally 20 millimeters, preferably no more than 10 millimeters and in an especially advantageous embodiment a thickness of less than 5 millimeters. An "elastomer" is herein to mean, in particular, a caoutchouc, a thermoplastic elastomer, e.g. a TPU, or a silicone. An "arm support for a passenger" is to mean, in particular, a zone of an armrest of a seat on which a passenger can rest his arm while sitting on the seat. "Provided" is to mean, in particular, specifically programmed, designed and/or equipped. By an object being provided for a certain function is to be understood, in particular, that the object implements and/or carries out said certain function in at least one application state and/or operation state. Herein a "comfort structure" is to mean, in particular, a structure that is introduced into the cushion unit and which has an influence on an elastic deformability due to its design. The structure is herein preferably implemented by one or several pockets or grooves. Herein the pockets or grooves implementing the comfort structure have a depth that corresponds to 80% of the thickness of the cushion unit, advantageously to less than 60% of the thickness of the cushion unit and in an especially advantageous embodiment to 50% of the thickness of the cushion unit. Herein different degrees of deformability, i.e. of a hardness of the cushion unit in different zones, are in particular advantageously achievable by differently implementing the comfort structure in different zones of the cushion unit. An "adjusting of an elastic deformability" is herein to mean, in particular, that by a design of the comfort structure an elastic deformability, and hence a hardness of the cushion unit, can be increased or reduced and can thus be set to an elastic deformability that is advantageous and desired for the desired application. In this way a hardness and thus a comfort of the cushion unit can be adapted to different embodiments of the armrest device in a particularly simple and cost-effective fashion.

By an implementation according to the invention, a high level of comfort, haptic and variability of the armrest device is particularly advantageously achievable. A color, a haptic and an elastic characteristic of the cushion unit may be adapted to different seats, in particular to different aircraft seats of different airlines or for different equipment, in a simple and cost-effective fashion. Herein in particular the choice and use of different colors for different armrests is advantageous due to silicone being used, as silicone complies, independently from a specific color, with legal provisions, in particular regarding fire protection in aircraft construction.

Furthermore, it is proposed that the cushion unit comprises a support surface and the comfort structure is arranged on a side of the cushion unit that faces away from the support surface. A "support surface" is herein to be understood, in particular, as a surface of the cushion unit which is arranged on a side facing away from a frame of an armrest on which the cushion unit is arranged, and which forms a surface provided for a person sitting on the seat with the armrest to rest an arm on. Thereby the comfort structure can be arranged in an especially advantageous and simple fashion.

It is further proposed that the comfort structure is implemented by a filigree structure. A "filigree structure" is to mean, in particular, a structure of pockets adjacent to each other or of one or several contiguous grooves, which extend over an entire surface of the comfort structure. Thus the comfort structure can be easily implemented.

Moreover it is proposed that the comfort structure is implemented as a planar polygonal grid structure. Herein a "planar polygonal grid structure" is to mean, in particular, a structure of pockets that are arranged one beside the other, each of which has a polygonal shape. It is herein conceivable that the planar polygonal grid structure is, for example, embodied as an arrangement of rectangular, square or triangular pockets which are adjacent to each other. Preferably the planar polygonal grid structure is embodied as a honeycomb structure formed of preferably equilateral, hexagonal pockets that are adjacent to each other. Herein the planar polygonal grid structure implemented as a honeycomb structure preferably has a width of 5 mm and a wall thickness of 1.5 mm. Thereby the comfort structure can be implemented in a particularly advantageous manner.

It is also proposed that the cushion unit is implemented at least substantially by a silicone. By "at least substantially" is herein to be understood, in particular, that the cushion unit is embodied as a silicone by at least 60%, preferably by 90% and in an especially advantageous implementation entirely. By a "silicone" is herein to be understood, in particular, a silicone elastomer, which in particular forms a mass having a rubber-like elasticity.

Furthermore it is proposed that the armrest device comprises a coating, which at least partially encompasses the cushion unit for the purpose of protection. A "coating" is to mean, in particular, a layer applied onto the armrest device, which is provided at least for improving haptic characteristics of the armrest device. Herein the coating is fixedly connected to the cushion unit by substance-to-substance bond, by form-lock and/or by means of an adhesive bond. Herein the coating is preferably embodied by a thin layer of varnish, which is applied onto the cushion unit embodied as a silicone by a suitable method, while entering a substance-to-substance bond with the cushion unit and/or while being adhesively connected to the cushion unit. Principally it is also conceivable that the coating is embodied as a cover made of a fabric, a leather or another cover that is deemed expedient by the person skilled in the art and is manufactured naturally or artificially, which cover is fitted over the cushion unit implemented by silicone. Herein "at least partially encompassing" is to mean, in particular, that the coating completely covers the cushion unit at least on the support surface formed by the cushion unit and on surfaces which in a fully assembled state can be seen and/or touched by a passenger. The cushion unit is herein preferably completely covered by the coating. As a result of this, a haptic of the armrest device can be particularly advantageously influenced, thus in particular enhancing a comfort for a passenger.

It is further proposed that the armrest device comprises an inlay, which is at least substantially encompassed by the cushion unit that is at least substantially implemented by a silicone. An "inlay" is herein to mean, in particular, a carrier structure, which is embodied, in particular, in an early manufacturing stage of the armrest device as a separate individual element, which is fixedly connected to the cushion unit during one manufacturing step. The inlay is herein embodied as a carrier structure for the cushion unit and preferably comprises connection elements, by means of which the armrest device can be fixedly connected to a frame of an armrest. Herein "at least substantially encompassed" is to mean, in particular, that the inlay is covered by the cushion unit to at least 50%, preferably at least over an entire side that faces the support surface of the cushion unit. The inlay is herein preferably connected to the cushion unit by means of a form-fit, adhesive and/or substance-to-substance connection. Thereby an elastic deformability of the armrest device and thus a comfort can be be adjusted in a particularly advantageous fashion.

It is also proposed that the inlay is at least substantially implemented by a high-temperature resistant material. By a "high-temperature resistant material" is herein to be understood, in particular, a material that is dimensionally stable up to a temperature of 180° C. and in an especially advantageous embodiment up to a temperature of 280° C. In this the high-temperature resistant material is preferentially implemented by a high-temperature resistant plastic, e.g. a polyamide or a polycarbonate. Principally it is, however, also conceivable that the high-temperature resistant material is implemented by a metal, e.g. aluminum, or by another natural or artificial material that is dimensionally stable up to a temperature of 180° C. or particularly advantageously up to a temperature of 280° C. As a result of this, the inlay can be embodied in a particularly advantageous fashion, in particular for manufacturing the armrest device from a silicone.

Moreover it is proposed that the inlay is implemented at least substantially by a fiber-reinforced composite material. By "implemented at least substantially by a fiber-reinforced composite" is herein to be understood, in particular, that the inlay is implemented by a fiber-reinforced composite preferably by 60%, especially advantageously by 90% and in a particularly advantageous embodiment entirely. In this a "fiber-reinforced composite" is to mean, in particular, a multi-phase material comprising at least two main components, and comprising at least one embedding matrix as well as reinforcing fibers. The embedding matrix may preferably be embodied as a plastic, a resin and/or a further material that is deemed expedient by the person having ordinary skill in the art, and the fibers can be implemented by plastic fibers, glass fibers, carbon fibers, natural fibers and/or other fibers that are deemed expedient by the person having ordinary skill in the art. As a result of this, the inlay can in particular be implemented with a favorable stiffness-to-weight ratio.

Furthermore, a seat with an advantageous armrest device is proposed. The seat is herein preferably embodied as an aircraft seat for being mounted in an aircraft, principally it is, however, also conceivable that the seat is embodied as a vehicle seat, as an office chair, an armchair or as another seat that is deemed expedient by the person having ordinary skill in the art.

The armrest device according to the invention is herein not to be limited to the application and implementation form described above. In particular, the armrest device according to the invention may comprise, for implementing a functionality herein described, a number of respective elements, structural components and units that differs from a number herein mentioned.

BRIEF DESCRIPTION OF DRAWINGS

Further advantages may be gathered from the following description of the drawings. In the drawings two exemplary embodiments of the invention are shown. The drawings, the description and the claims contain a plurality of features in combination. The person having ordinary skill in the art will purposefully also consider the features separately and will find further expedient combinations.

It is shown in.

DETAILED DESCRIPTION

Figure 1:
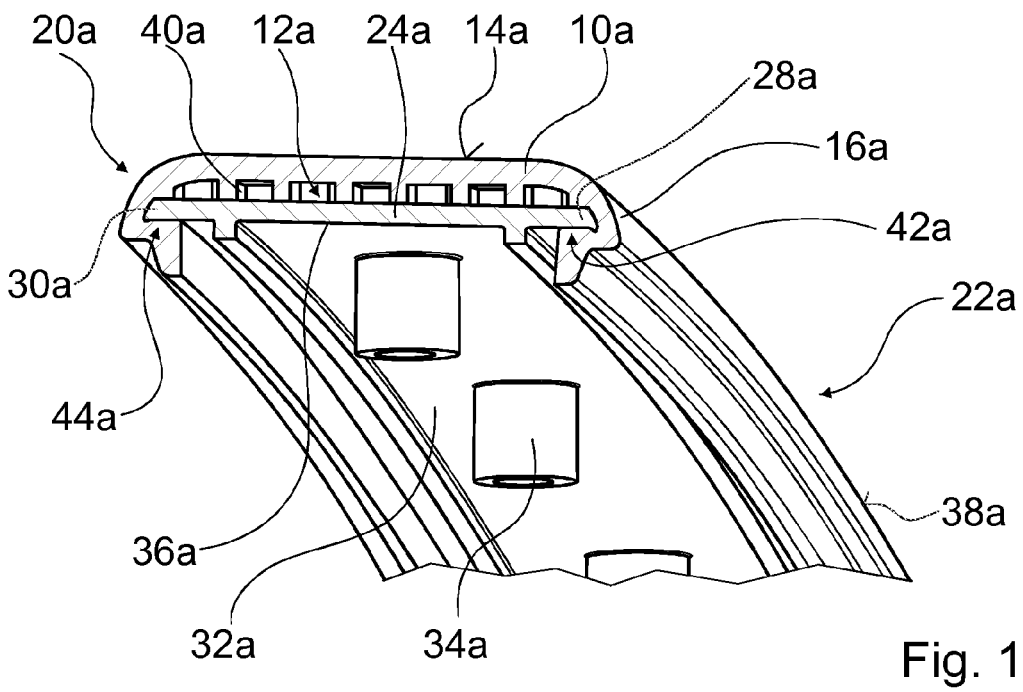
FIG. 1 a section view through an armrest device according to the invention in a first exemplary embodiment on a base plate of the armrest, FIG. 2 the armrest device and the base plate in a schematic exploded view, FIG. 3 an armrest device according to the invention in a second exemplary embodiment, FIG. 4 the armrest device in the second exemplary embodiment in an exploded view, and FIG. 5 a schematic depiction of the armrest device in the second exemplary embodiment with a section thereof.
Figure 2:
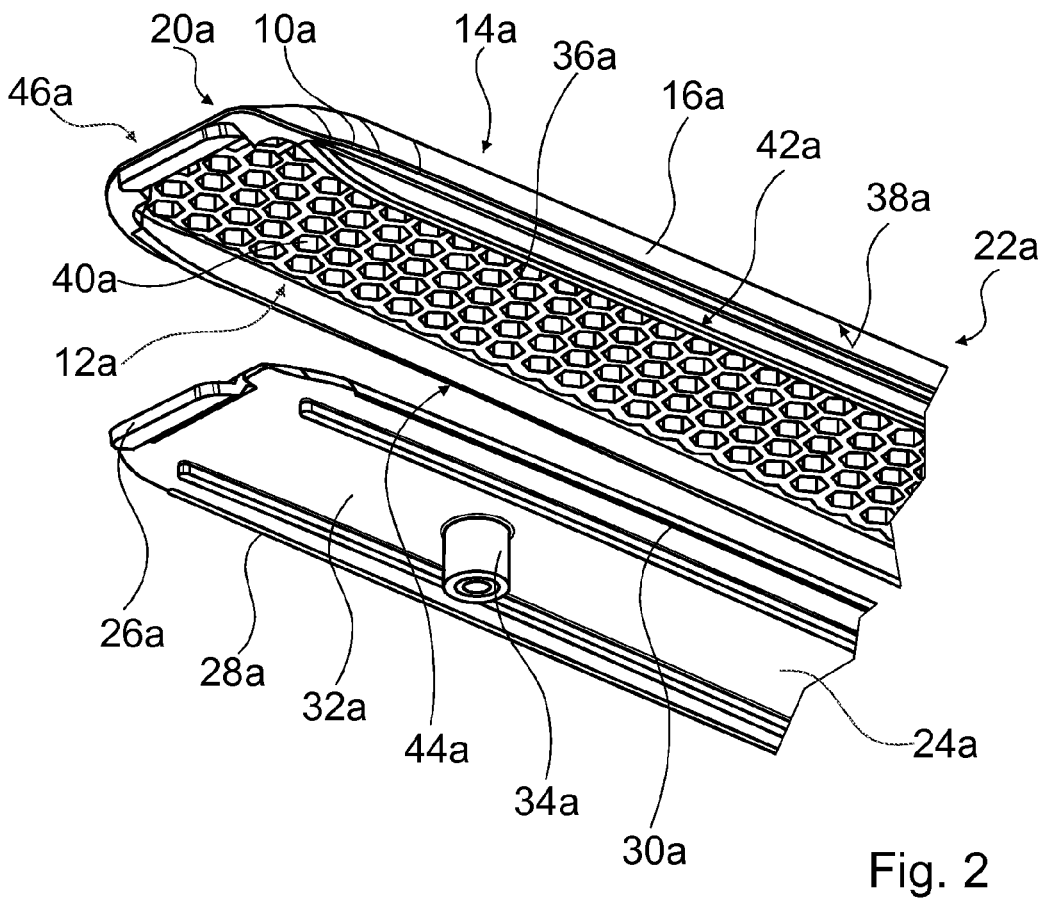

FIGS. 1 and 2 show a first exemplary embodiment of an armrest device 20a according to the invention. The armrest device 20a is embodied as part of a seat that is not shown in detail. The seat is herein implemented as an aircraft seat. The seat that is implemented as an aircraft seat comprises a backrest for supporting a back of a passenger. The seat further comprises a seat bottom, which forms a seat surface for the passenger. The seat comprises a mounting unit, at which the backrest and the seat bottom are arranged. The seat implemented as an aircraft seat is furthermore mounted on a floor of a passenger cabin by means of the mounting unit. Furthermore the seat comprises laterally to the seat surfaces respectively one armrest 22a, which is provided to form an arm support for a passenger. The armrests 22a delimit the seat bottom laterally and supply the passenger with an opportunity of resting his arms while sitting. The armrests 22a herein each comprise a frame (not shown in detail), which extends from the seat bottom in a direction away from the floor on which the aircraft seat is mounted. The armrest device 20a is part of the only partially shown armrest 22a and is fastened to the frame of the armrest 22a to form a support surface 14a for an arm of a person sitting on the seat. The frame of the armrest 22a comprises a base plate 24a, which forms a base surface of the armrest 22a. A base surface of the armrest 22a is herein embodied approximately rectangular, having a long side and a short side. The long side of the base surface of the armrest 22a is herein, in an assembled state, oriented parallel to a seat direction. It is herein conceivable that the base surface of the armrest 22a has differing widths over its longer side, i.e. along its longitudinal extension. It is herein principally conceivable that the base surface of the armrest 22a is domed in its longitudinal extension and/or in its extension over a width. Herein, in the following, an end of the base plate 24a that faces towards the backrest is designated as a rear end, an end of the base plate 24a facing away from the backrest is designated as a front end 26a, a side facing towards the seat bottom is designated as an inner side 28a and a side facing away from the seat bottom is designated as an outer side 30a of the base plate 24a. The base plate 24a comprises at its underside 32a, which faces towards the floor of the passenger cabin, a plurality of fastening domes 34a, via which the base plate 24a is fixedly connected to the frame of the armrest 22a by means of a screw connection. The armrest device 20a is in an assembled state mounted on the base plate 24a of the frame of the armrest 22a. In the following, structural elements, units and/or elements of which there are more than one, are respectively given only one reference numeral in FIGS. 1 to 5.

The armrest device 20a comprises a cushion unit 10a. The cushion unit 10a is provided to form an elastic substrate for the arm support of the passenger. Herein the cushion unit 10a has a shape of the armrest 22a. The cushion unit 10a has a thickness of four millimeters. In an assembled state the cushion unit 10a extends over the entire base surface of the base plate 24a of the armrest 22a. At the front end and the rear end 26a as well as at the inner and outer sides 28a, 30a, the cushion unit 10a engages around the base plate 24a, whereby the cushion unit 10a entirely encompasses the base plate 24a in a zone that can be touched by a passenger. The cushion unit 10a comprises an interior side 36a, which faces in the assembled state towards the base plate 24a and with which the cushion unit 10a lies upon the base plate 24a. An exterior side 38a of the cushion unit 10a is arranged on the side of the cushion unit 10a opposite the interior side 36a and delimits the cushion unit 10a towards the outside. The exterior side 38a of the cushion unit 10a is herein embodied substantially planar. Principally it is also conceivable that the exterior side 38a has a pattern of bulges and/or hollows for modifying a haptic. A surface of the exterior side 38a of the cushion unit 10a that extends parallel to the base plate 24a is embodied as a support surface 14a. The cushion unit 10a is implemented by a silicone. Herein the cushion unit 10a is completely implemented by a silicone. The silicone is herein embodied as a silicone elastomer. Herein the silicone, which is embodied as a silicone elastomer, has a Shore hardness of 50 Shore A. Principally it is also conceivable that the silicone has another Shore hardness, e.g. a Shore hardness of 40 Shore A or 70 Shore A. The cushion unit 10a implemented by silicone herein has a solid structure and an elastic deformability. By a force impact from the outside, e.g. by laying an arm on, the cushion unit 10a implemented by silicone is elastically deformed. When the force applied from outside has been released, the cushion unit 10a reverts from its elastically deflected state into its normal state.

For adjusting an elastic deformability, the cushion unit 10a comprises a comfort structure 12a. The comfort structure 12a is herein implemented by a filigree structure. The comfort structure 12a is implemented as a structure of pockets 40a that are adjacent to each other. By way of the comfort structure 12a an elastic deformability of the cushion unit 10a is increased, as in case of a load the material of the cushion unit 10a can spread into the hollow spaces formed by the comfort structure 12a. Herein, by way of modifying the size and shaping of the comfort structure 12a, the elastic deformability can be easily adjusted for different armrest devices that have to fulfill, for example, different comfort requirements and for this need to have different elastic deformabilities. Herein the comfort structure 12a is arranged on a side that faces away from the support surface 14a of the cushion unit 10a, namely on the underside 32a of the cushion unit 10a. As a result of this, the comfort structure 12a is preferably not visible from the outside for a passenger.

Herein the comfort structure 12a is embodied as a planar polygonal grid structure. The comfort structure 12a forms honeycomb-shaped pockets 40a that are adjacent to each other and implement the entire comfort structure 12a. The comfort structure 12a herein extends over the entire underside 32a of the cushion unit 10a. It is herein also conceivable that regions of the underside 32a of the cushion unit 10a do not comprise a comfort structure 12a and/or that the comfort structure 12a has in partial regions of the underside 32a of the cushion unit 10a a shape and/or size different than in other partial regions, as a result of which an elastic deformability can be adjusted differently for differing partial regions of the cushion unit 10a. The pockets 40a herein have a depth of two millimeters, by which the pockets 40a extend into the cushion unit 10a.

For improving a haptic and for the protection of the cushion unit 10a, the armrest device 20a comprises a coating 16a, which encompasses the cushion unit 10a. Herein the coating 16a encompasses the cushion unit 10a completely at its exterior side 38a and its interior side. Principally it is also conceivable that the coating 16a completely encompasses the cushion unit 10a only on an exterior side 38a, which can be touched and/or seen by a passenger. The coating 16a is herein embodied as a silicone varnish. The silicone varnish is herein applied onto the cushion unit 10a in a manufacturing process of the armrest device 20a and in this enters into a substance-to-substance bond with the cushion unit 10a. Principally it is also conceivable that the coating 16a is embodied of a thin material that is fitted onto the cushion unit 10a, e.g. a fabric or leather. Herein the coating 16a is connected to the cushion unit 10a in a form-lock and/or by an adhesive bond.

For the connection of the armrest device 20a to the base plate 24a of the armrest 22a, the armrest device 20a comprises a form-lock unit. The form-lock unit comprises a plurality of form-lock elements 42a, 44a, 46a, which in an assembled state fixedly connect the armrest device 20a to the base plate 24a. The form-lock elements 42a, 44a, 46a of the armrest device 20a are herein embodied in a one-part implementation with the cushion unit 10a that is implemented from silicone. Herein one form-lock element 42a is arranged at an inner side, one form-lock element 44a at an outer side, one form-lock element 46a at a front end and one form-lock element at a rear end of the cushion unit 10a. The form-lock elements that are embodied correspondingly to the form-lock elements 42a, 44a, 46a of the armrest device 20a are implemented by the respective sides 28a, 30a and by ends 26a of the base plate 24a, which are in an assembled state encompassed by the cushion unit 10a. In an assembled state, the form-lock elements 42a, 44a, 46a of the armrest device 20a engage around the corresponding form-lock elements implemented by the ends 26a and sides 28a, 30a of the base plate 24a, thereby fixedly connecting the cushion unit 10a and thus the armrest device 20a to the base plate 24a of the armrest 22a. In this the cushion unit 10a that is implemented of silicone is during assembly elastically expanded to such an extent that the form-lock elements 42a, 44a, 46a of the armrest device 20a engage into the form-lock elements of the base plate 24a, the cushion unit 10a thus completely encompassing the base plate 24a. When an assembling force, which has elastically expanded the cushion unit 10a for orienting the form-lock elements 42a, 44a, 46a, is released, the cushion unit 10a contracts and is thus pressed into the form-lock elements of the base plate 24a together with the form-lock elements 42a, 44a, 46a, as a result of which a holding force is generated between the form-lock elements 42a, 44a, 46a of the armrest device 20a and the base plate 24a. As a result of this, the armrest device 20a is fixedly and securely connected to the base plate 24a. Principally it is also conceivable that, for the purpose of securing the armrest device 20a against inadvertent or unauthorized removal of the armrest device 20a from the base plate 24a of the armrest 22a, a securing element, e.g. a screw, connects the armrest device 20a to the base plate 24a, in addition to the form-lock elements 42a, 44a, 46a.

Figure 3:
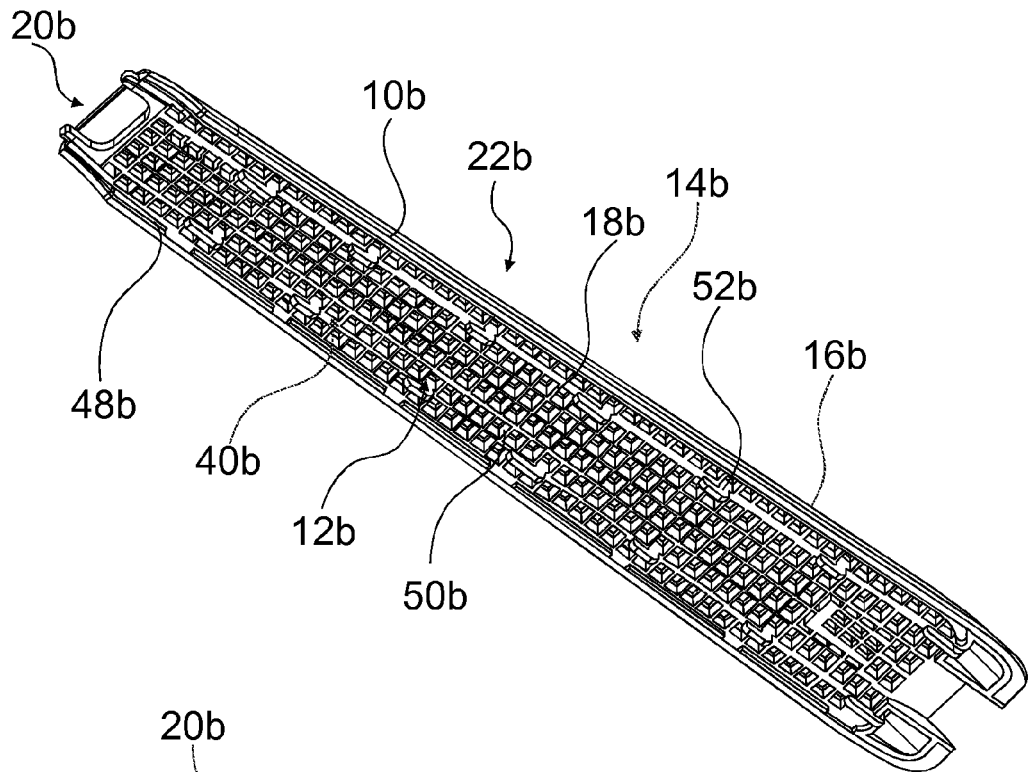
Figure 4:
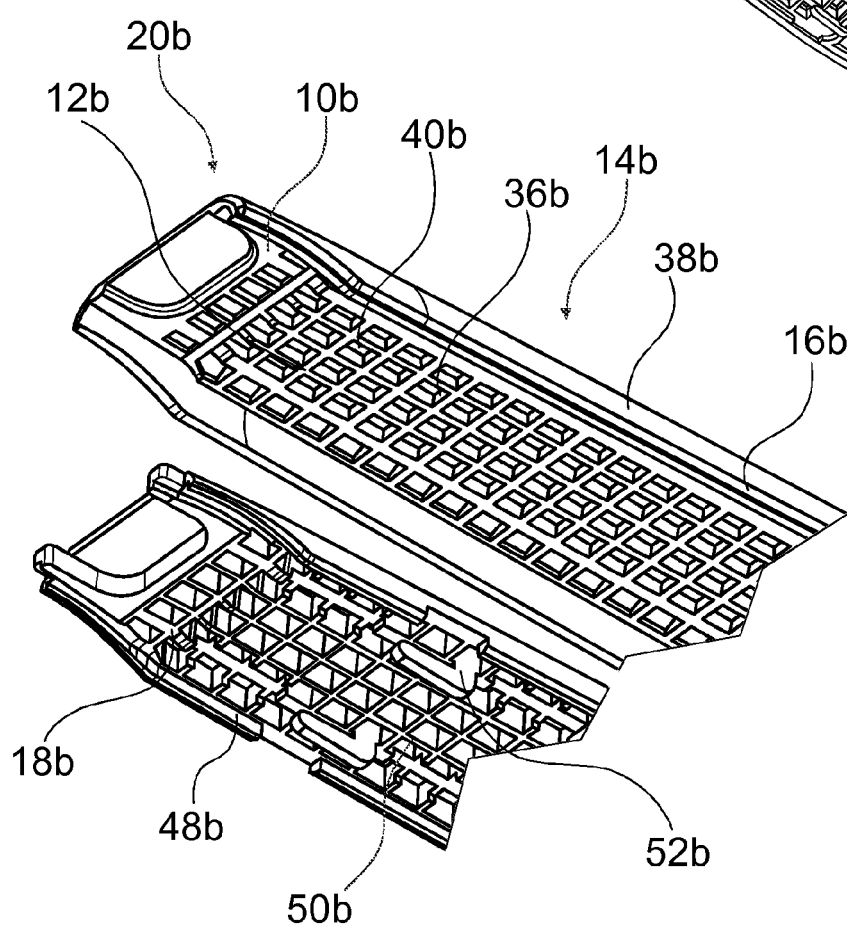
Figure 5:
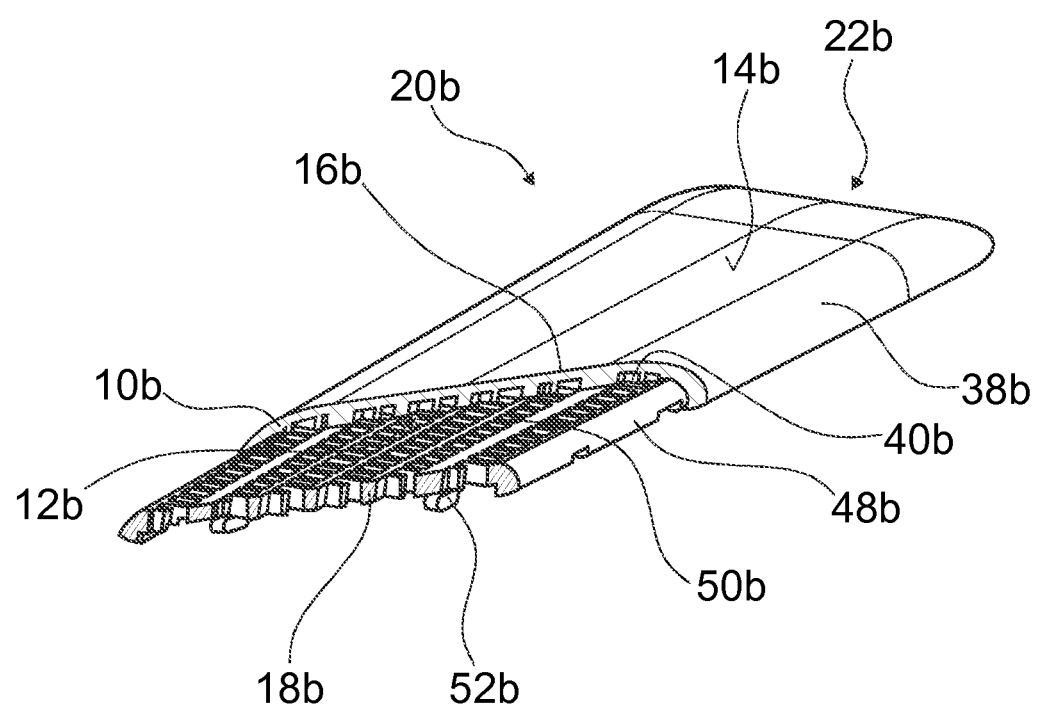

In FIGS. 3 to 5 a further exemplary embodiment of the invention is shown. The following description and the drawings are substantially limited to the differences between the exemplary embodiments, wherein regarding identically designated structural elements, in particular regarding structural elements with the same reference numerals, principally the drawings and/or the description of the other exemplary embodiment in particular of FIGS. 1 and 2 may be referred to. For distinguishing between the exemplary embodiments the letter a is put after the reference numerals of the exemplary embodiment in FIGS. 1 and 2. In the exemplary embodiment of FIGS. 3 to 5 the letter a has been replaced by the letter b.

FIGS. 3 to 5 show a second exemplary embodiment of an armrest device 20b according to the invention. The armrest device 20b is embodied as part of a seat that is not shown in detail. The armrest device 20b is part of an only partially shown armrest 22b and is fastened to a frame of the armrest 22b to form a support surface for a person sitting on the seat. The frame of the armrest 22b comprises a base plate (not shown in detail), which forms a base surface of the armrest 22b.

The armrest device 20b comprises a cushion unit 10b. The cushion unit 10b is provided to form an elastic substrate for the arm support of the passenger. Herein the cushion unit 10b has a shape of the armrest 22b. In an assembled state, the cushion unit 10b extends over the entire base surface of the base plate of the armrest 22b. For adjustment of an elastic deformability, the cushion unit 10b comprises a comfort structure 12b. The comfort structure 12b is implemented as a structure of pockets that are adjacent to each other. Herein the comfort structure 12b is implemented as a planar polygonal grid structure. The comfort structure 12b forms rectangular pockets that are adjacent to each other and implement the entire comfort structure 12b. Herein the comfort structure 12b extends over an entire underside of the cushion unit 10b.

The armrest device 20b comprises an inlay 18b. The inlay 18b is partially encompassed by the cushion unit 10b that is implemented of silicone. The inlay 18b substantially has the shape of the base plate of the armrest 22b. The inlay 18b comprises a frame 48b, which delimits the inlay 18b at an inner side, an outer side, a front end and at a rear end. The frame 48b of the inlay 18b is herein embodied of solid material. The frame 48b completely encompasses a middle region of the inlay 18b. The middle region of the inlay 18b is herein implemented by a lattice structure 50b. The lattice structure 50b is embodied correspondingly to the comfort structure 12b of the cushion unit 10b. The lattice structure 50b is implemented by rectangles that are adjacent to each other. The inlay 18b is in a pre-assembled state connected to the cushion unit 10b in a form-lock and a substance-to-substance bond. During a production process of the armrest device 20b, first of all the inlay 18b is manufactured. The inlay 18b is then, preferably in a hardened state, encompassed by the cushion unit 10b implemented by silicone in an injection-molding process. The comfort structure 12b of the cushion unit 10b is herein achieved by injecting through the lattice structure 50b of the inlay 18b. Herein the cushion unit 10b connects during manufacturing to the inlay 18b of the armrest device 20b by adhesive bond, substance-to-substance bond and/or by form-lock.

For a secure production of the armrest device, the inlay 18b is embodied of a high-temperature resistant material. The inlay 18b is herein made of a fiber-reinforced composite, which is implemented by an embedding matrix and glass fibers embedded in the matrix. Herein the inlay 18b, which is implemented of the high-temperature resistant fiber-reinforced composite, is dimensionally stable up to temperatures of 280° C., as a result of which a tempering process of the cushion unit 10b that is implemented of silicone can be carried out with the inlay 18b located in the cushion unit 10b without deformation of the inlay 18b.

For the purpose of connecting the armrest device 20b to the base plate of the frame of the armrest, the inlay 18b comprises a plurality of form-lock elements 52b. The form-lock elements 52b are herein arranged at an underside of the inlay 18b, which in an assembled state faces towards the base plate. The form-lock elements 52b are embodied in a one-part implementation with the inlay 18b. The form-lock elements 52b are herein embodied as latch hook, which in the assembled state latch into latch elements (not shown in detail) of the base plate, fixedly connecting the armrest device 20b to the base plate. Principally it is also conceivable that the armrest device 20b is fixedly connected to the base plate by means of a different connection method that is deemed expedient by the person having ordinary skill in the art, e.g. by an adhesive bond or by another form-lock and/or force-lock connection.

REFERENCE NUMERALS 10 cushion unit
12 comfort structure
14 support surface
16 coating
18 inlay
20 armrest device
22 armrest
24 base plate
26 front end
28 inner side
30 outer side
32 underside
34 fastening dome
36 interior side
38 exterior side
40 pocket
42 form-fit element
44 form-fit element
46 form-fit element
48 frame
50 lattice structure
52 form-fit element

The invention claimed is:

1. An armrest device for an aircraft seat, and the armrest device includes a cushion unit forming an elastic base for an arm support for a passenger, wherein the cushion unit comprises:
   at least an elastomer, and
   a comfort structure, which is provided for adjustment of an elastic deformability of the cushion unit, wherein
   the cushion unit is implemented by a silicone,
   the comfort structure is implemented as a planar polygonal grid structure, and
   the comfort structure forms honeycomb-shaped pockets that are adjacent to each other and implement the entire comfort structure or the comfort structure forms rectangular pockets that are adjacent to each other and implement the entire comfort structure.

2. The armrest device according to claim 1, wherein the cushion unit comprises a support surface and the comfort structure is arranged on a side of the cushion unit that faces away from the support surface.

3. The armrest device according to claim 2, wherein the comfort structure is implemented by a filigree structure.

4. The armrest device according to claim 2, comprising a coating, which encompasses the cushion unit for protection.

5. The armrest device according to claim 2, comprising an inlay, which is encompassed by the cushion unit.

6. The armrest device according to claim 5, wherein the inlay is implemented by a high-temperature resistant material.

7. The armrest device according to claim 1, wherein the comfort structure is implemented by a filigree structure.

8. The armrest device according to claim 1, comprising a coating, which encompasses the cushion unit for protection.

9. The armrest device according to claim 1, comprising an inlay, which is encompassed by the cushion unit.

10. The armrest device according to claim 1, wherein the inlay is implemented by a high-temperature resistant material.

11. The armrest device according to claim 10, wherein the inlay is implemented by a fiber-reinforced composite material.

12. The armrest device according to claim 1, wherein the inlay is implemented by a fiber-reinforced composite material.

13. A seat with an armrest device according to claim 1.

14. An armrest device for an aircraft seat, and the armrest device includes a cushion unit forming an elastic base for an arm support for a passenger, wherein the cushion unit comprises:
   at least an elastomer,
   a comfort structure, which is provided for adjustment of an elastic deformability of the cushion unit, and
   a support surface, wherein
   the cushion unit is implemented by a silicone,
   the comfort structure is formed by the cushion unit,
   the comfort structure is arranged on a side of the cushion unit that faces away from the support surface, and
   the comfort structure comprises pockets that are adjacent to each other.

15. An armrest device for an aircraft seat, and the armrest device includes a cushion unit forming an elastic base for an arm support for a passenger, wherein the cushion unit comprises:
   at least an elastomer, and
   a comfort structure, which is provided for adjustment of an elastic deformability of the cushion unit, wherein
   the cushion unit is implemented by a silicone,
   the comfort structure and the cushion unit are implemented in one piece, and
   the comfort structure is formed by a planar structure of pockets, which are adjacent to each other and are formed by polygonal hollow spaces.

* * * * *